US010244027B1

(12) United States Patent
Elmasry

(10) Patent No.: US 10,244,027 B1
(45) Date of Patent: Mar. 26, 2019

(54) VIDEO TELECONFERENCING SERVICES FOR A VEHICLE OR REMOTE LOCATIONS

(71) Applicant: Rockwell Collins, Inc., Cedar Rapids, IA (US)

(72) Inventor: George F. Elmasry, San Marcos, CA (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 56 days.

(21) Appl. No.: 15/655,829

(22) Filed: Jul. 20, 2017

(51) Int. Cl.
| | |
|---|---|
| *H04L 29/06* | (2006.01) |
| *H04N 7/15* | (2006.01) |
| *H04N 7/14* | (2006.01) |
| *H04L 12/823* | (2013.01) |
| *H04L 12/801* | (2013.01) |
| *H04B 7/185* | (2006.01) |

(52) U.S. Cl.
CPC ......... *H04L 65/80* (2013.01); *H04B 7/18506* (2013.01); *H04L 47/14* (2013.01); *H04L 47/32* (2013.01); *H04L 65/102* (2013.01); *H04L 65/105* (2013.01); *H04L 65/605* (2013.01); *H04N 7/147* (2013.01); *H04N 7/15* (2013.01)

(58) Field of Classification Search
CPC ..... H04L 65/80; H04L 65/102; H04L 65/105; H04L 65/605; H04N 7/15; H04N 7/147; H04N 47/32; H04N 47/14; H04B 7/18506
USPC .......... 370/401, 349, 389, 325, 316
See application file for complete search history.

(56) References Cited

U.S. PATENT DOCUMENTS

2002/0007234 A1* 1/2002 Heppe ................ H04B 7/18506
701/10
2017/0144773 A1* 5/2017 Raman ................... B64D 45/00

* cited by examiner

*Primary Examiner* — Brenda H Pham
(74) *Attorney, Agent, or Firm* — Donna P. Suchy; Daniel M. Barbieri

(57) ABSTRACT

A voice over internet protocol (VoIP) system for an aircraft includes a ground gateway, an aircraft gateway disposed on the aircraft, and a service provider network disposed on the aircraft. The ground gateway is in communication with the aircraft gateway via the service provider network. The aircraft gateway includes a first proxy agent, and the ground gateway includes a second proxy agent. The first proxy agent and the second proxy agent communicate a network packet for a number streams. The network packet includes a header and voice payloads for the streams.

20 Claims, 3 Drawing Sheets

VIDEO TELECONFERENCING SERVICES FOR A VEHICLE OR REMOTE LOCATIONS

BACKGROUND

The inventive concepts disclosed herein relate generally to the field of communication systems. More particularly, embodiments of the inventive concepts disclosed herein relate to systems and methods for providing video teleconferencing (VTC) services in remote locations or for a vehicle (e.g., an aircraft, ship, or land vehicle).

Conventional VTC services require communication links with a large communication bandwidth (BW) and high reliability. As a result, VTC services for vehicles, such as, private jets and passenger aircraft, and for remote locations are either very expensive or not offered at all. Some high-end luxury private aircraft may provide VTC services that require expensive air-ground communication links that ensure low packet drop ratio and offer enough BW to carry a single VTC session. There is a need for lower cost VTC services for private jets and passenger aircrafts as well as remote locations.

SUMMARY

In one aspect, the inventive concepts disclosed herein are directed a system for providing video teleconferencing services for a vehicle or remote location. The vehicle or remote location includes a first gateway in communication with a service provider network. The system includes a second gateway in communication with the first gateway via the service provider network. The second gateway includes a first proxy agent. The first proxy agent communicates I-frame packets and P-frame packets for a video teleconferencing service using network coding. The I-frame packets are provided in a burst of a number K of packets, where the number K minus a number N is a number of redundant I-frame packets. The network coding is applied to a number L of the P-frame packets in a series; the number L is an integer less than 6. The numbers K and N are integers.

In another aspect, the inventive concepts disclosed herein are directed to a system for providing video teleconferencing services for a vehicle or remote location. The vehicle or remote location includes a first gateway in communication with a service provider network. A second gateway is in communication with the first gateway via the service provider network. The first gateway includes a first proxy agent. The first proxy agent communicates I-frame packets and P-frame packets for a video teleconferencing service using network coding. The I frame packets are provided in a burst of a number K of packets, where the number K minus a number N is a number of redundant I-frame packets. The network coding is applied to a number L of the P-frame packets in a series; the number L being an integer less than 6. The numbers K and N are integers.

In a further aspect, the inventive concepts disclosed herein are directed to a method of providing video teleconferencing services for a vehicle or remote location. The method includes receiving I-packets and P-packets associated with video teleconferencing services at a first proxy agent disposed on the vehicle or at the remote location, processing the I-packets and P-packets at the first proxy agent and intentionally dropping at least one P-frame packet in response to network conditions. The method also includes providing the I-packets and the undropped P-packets to a second proxy agent in communication with the first gateway via a service provider network having the network conditions.

In a further aspect, the inventive concepts disclosed herein are directed to a system for providing video teleconferencing services for a vehicle or remote location. The system includes a first gateway disposed on the vehicle or at the remote location in communication with a service provider network. The service provider network is in communication with a second gateway in communication with a ground network with web services. The first gateway processes I-frame packets and P-frame packets for a video teleconferencing service. The P-frame packets are intentionally dropped either before transmitting from the first gateway to the service provider network in response to network conditions or after receipt by the first gateway from the service provider network in response to a missing P-frame packet.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
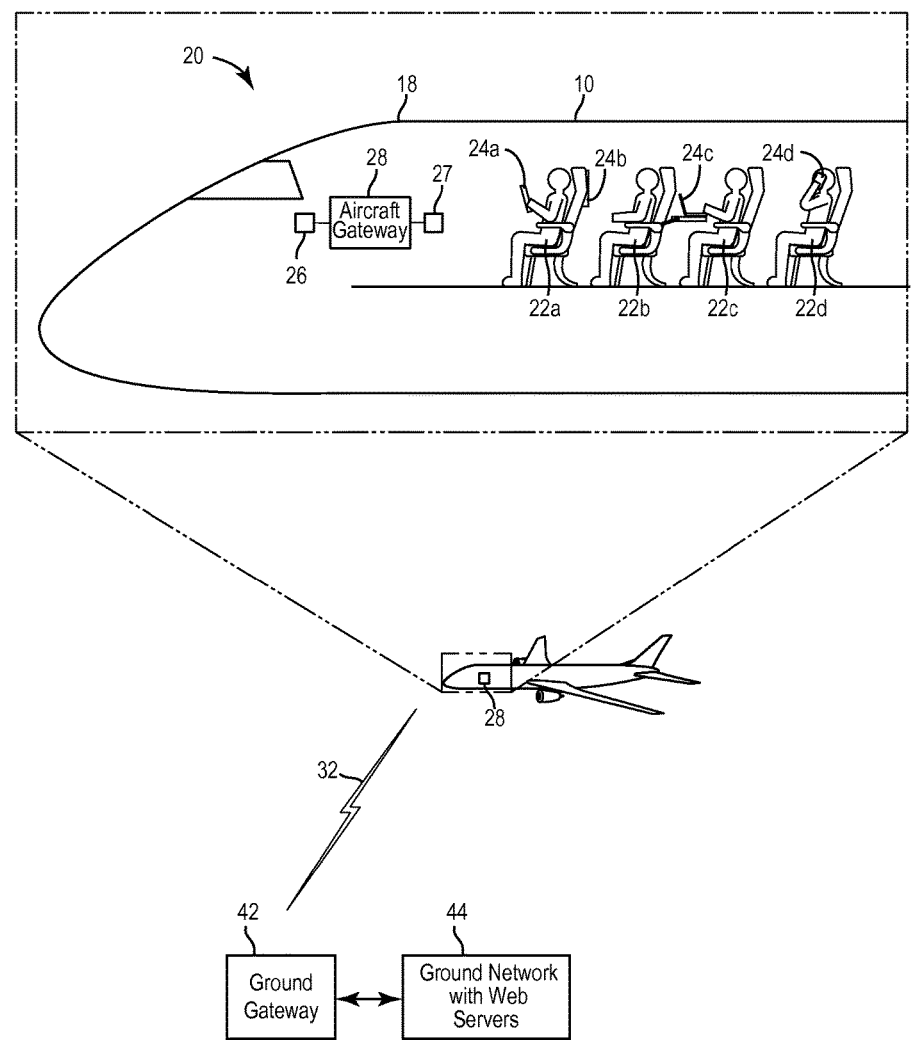
FIG. 1 is a schematic illustration of VTC communication system for an aircraft including a VTC airborne gateway in communication with a ground network with web services according to exemplary aspects of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B is true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Embodiments of the inventive concepts disclosed herein are directed to systems and methods of offering passengers on board a commercial or private aircraft VTC services that are reliable, low cost, and minimize the use of BW. However, the systems and methods can be utilized in remote areas or on other vehicles including ground based and naval vehicles. In some embodiments, the systems and methods allow multiple VTC sessions (e.g., for first class and business class passengers) between the aircraft and the ground while using low cost wideband service providers for air-ground communication links. The systems and methods use different proxy agents that work together to optimize the performance of VTC sessions given the unique environments and network conditions associated with aircraft and remote locations in some embodiments.

In some embodiments, the systems and methods extend WebEx H.264 VTC services from a ground network to the aircraft. The system and methods use proxy techniques that manipulate the VTC packet stream over the air-ground link to overcome the challenges of the air-ground links such as bandwidth limitation, high packet loss, and variations of packet delay in some embodiments. In some embodiments, the systems and methods aim to maximize the VTC user perception of the session quality through techniques that shape traffic flow (e.g., intentionally drop packets), protect packets with network coding to overcome packet loss, concatenate small packets to save bandwidth, and synchronize the stream before it reaches the VTC decoder.

In some embodiments, the systems and methods use the proxy techniques similar to the proxy techniques for voice streams described in U.S. patent application Ser. No. 15/594,324, (47141 1257) incorporated herein by reference in its entirety and assigned to the assignee of the present application. In some embodiments, a codec (e.g., a H.264 codec) separates the voice stream from the video stream, and the voice stream is processed according to the voice over IP systems and methods provided in U.S. patent application Ser. No. 15/594,324, (47141 1257) using concatenation for the voice payloads in some embodiments. In some embodiments, proxy techniques that pertain to the video stream as well as the synchronization of the voice and video stream are provided before both streams enter the decoder. In some embodiments, a collection of proxy techniques over the air-ground links allow VTC services to be extended to aircraft and remote locations using existing H.264 techniques used with networks with Cisco WebEx services. A subset of these proxy techniques can be used to adapt to different air-ground links characteristics in order to make VTC services available to passengers on private and commercial aircraft in some embodiments.

With reference to FIG. 1, an aircraft 10 includes a VTC communication system 20. The aircraft houses passengers 22a-m with access to VTC services via the VTC communication system 20 (where 24m represents a last passenger). The passengers 22a-m have access to terminals, handsets or devices 24a-m for VTC services. The VTC communication system 20 includes a wide area network (WAN) interface unit 26, a local area network (LAN) interface unit 27, an aircraft VTC proxy agent gateway 28, a wireless communications media or a service provider network 32, and a ground VTC proxy agent gateway 42. The ground VTC proxy agent gateway 42 is coupled to or in communication with a ground network 44. The ground network 44 includes Cisco web services in some embodiments. The aircraft VTC proxy agent gateway 28 is coupled with or in communication with the communications media or service provider network 32 via the WAN interface unit 26. The aircraft VTC proxy agent gateway 28 is coupled with or in communication with the devices 24a-m via the LAN interface unit 27. The ground VTC proxy agent gateway 42 is in communication with the service provider network 32.

The devices 24a-m can reside on or be cellular phones (e.g., smart phones), lap top computers, tablets, or a smart application or can be in-seat or cabin video conferencing units, or other communication devices. The devices 24a-m function as a video telephones configured for use with the VTC communication system 20. Each device 24a-m includes a processor unit, a memory, and communication hardware. The memory stores one or more programs which, when executed by the processor, facilitate operation of the devices 24a-m within the VTC communication system 20.

In some embodiments, the aircraft 10 communicates with the service provider network 32 via the WAN interface unit 26 (FIG. 2) which can include a data radio for providing off aircraft communications. In some embodiments, the WAN interface unit 26 can interface to an L-Band Low Earth Orbit (LEO), a Ku band geosynchronous (GEO), or a Ka band GEO satellite radio. In some embodiments, the service provider network 32 is a private network or a broadband satellite network to provide communications to a ground commercial wireless network (e.g., a receiving station coupled to the ground VTC proxy agent gateway 42 via a satellite network) and includes the equipment for communicating with such networks.

The aircraft VTC proxy agent gateway 28 is a network device for processing communications between the service provider network 32 and the devices 24*a-m*. The aircraft VTC proxy agent gateway 28 is aboard the aircraft 10 (or at a remote location) and includes a software defined network (SDN) platform in some embodiments. The aircraft VTC proxy agent gateway 28 is coupled wirelessly or via wired connection to the devices 24*a-m*. The ground VTC proxy agent gateway 42 is a peer to the aircraft VTC proxy agent gateway 28 and is a network device for processing communications between the service provider network 32 and the ground network 44. The ground VTC proxy agent gateway 42 is remote from the aircraft 10 (e.g., is a fixed land based network device) and includes an SDN platform in some embodiments. The ground VTC proxy agent gateway 42 is configured to provide a first proxy agent as a service relay point to the aircraft 10 and works with a second proxy agent of the aircraft VTC proxy agent gateway 28 to provide the VTC services.

The first and second proxy agents are peered together to ensure that the VTC services can be used seamlessly and reliably between the cabin of the aircraft 10 and the ground. The first and second proxy agents manipulate the actual video packets as described below to increase volume capabilities and reduce user perception of communication failures in some embodiments. Applicant has found that the largest cause of degradation of video quality in H.264 decoding operations comes from missing a single packet carrying H.264 encoded video information (due to packet drop or packet error). The H.264 decoding operations assumes the use of reliable ground networks where packet loss is rare which is not always a correct assumption when VTC services are performed in vehicles or remote locations. The proxy techniques at the ingress and egress points process the packet stream to compensate for potential communication failures over the service provider network 32 and are configured to cause the image to freeze rather than having the user perceive the image as garbled in some embodiments. As long as the voice information continues to be provided in a synchronized manner, a frozen video for one or two seconds in a video teleconference can usually be perceived as a minor inconvenience. A garbled screen, loss of voice, or losing synchronization between voice and video can often be considered a major degradation of quality.

In some embodiments, the first and second proxy agents process video packets that have been separated by the H.264 decoder (e.g., the voice packet stream is separated from the video packet stream), thereby allowing the aircraft VTC proxy agent gateway 28 and the ground VTC proxy agent gateway 42 to process the video and voice stream separately).

The ground VTC proxy agent gateway 42 and the aircraft VTC proxy agent gateway 28 can include the hardware and software described in U.S. patent application Ser. No. 15/594,324, (47141 1257) incorporated herein by reference for processing the separated voice stream. The ground VTC proxy agent gateway 42 and the aircraft VTC proxy agent gateway 28 can use time stamping to ensure synchronization of the separated video and voice streams.

Figure 2:
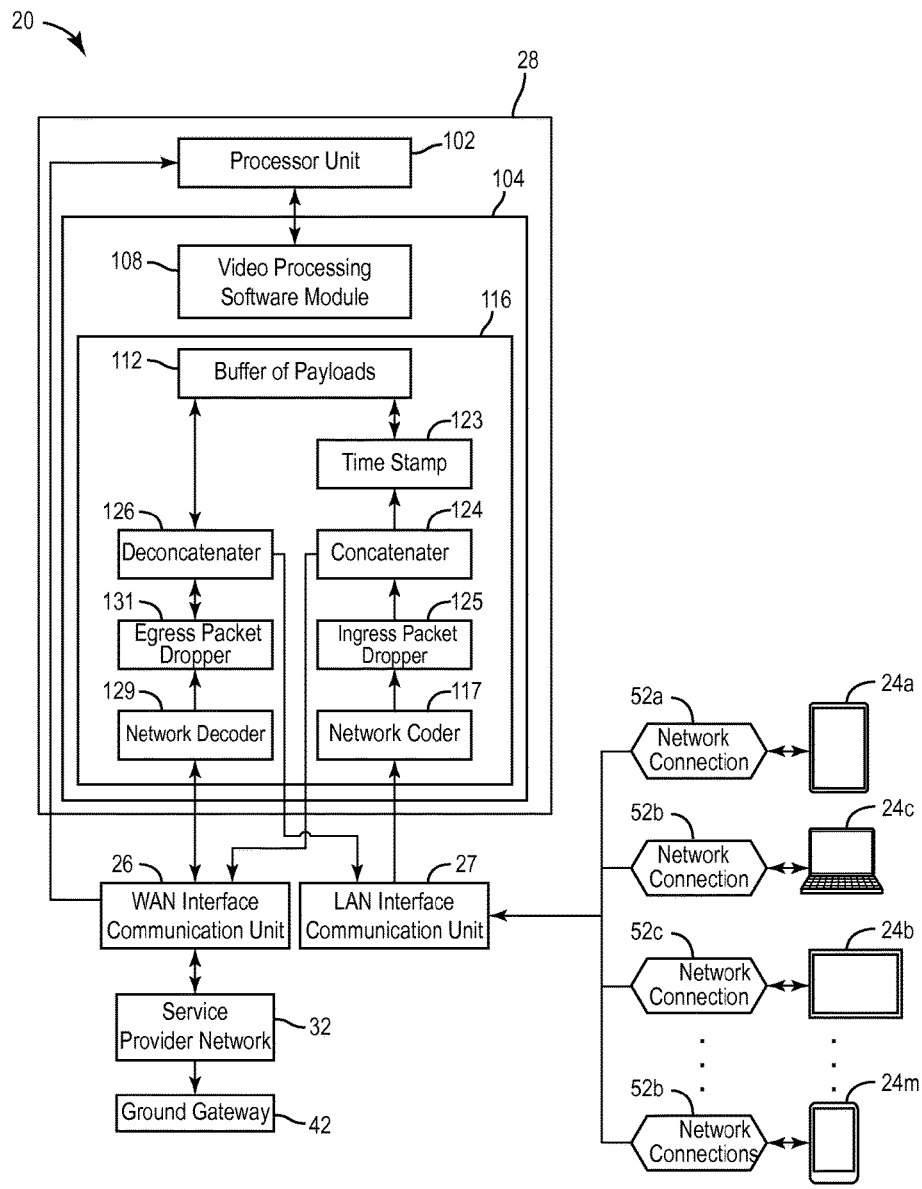
FIG. 2 is a general block diagram of the VTC communication system including the VTC airborne gateway illustrated in FIG. 1 according to exemplary aspects of the inventive concepts disclosed herein.

With reference to FIG. 2, the devices 24*a-m* are in communication with the aircraft VTC proxy agent gateway 28 via network connections 52*a-m* which can be wireless or wired links. Each device 24*a-m* can be associated with a single communication stream (e.g., a VTC session) processed by the VTC communication system 20. In some embodiments, the LAN interface unit 27 is coupled to the devices 24*a-m* through an Ethernet link or WiFi link. In some embodiments, the devices 24*a-m* include a VTC application (e.g., a codec such as an H.264 codec), a communications application, and a payload module for processing both downstream and upstream data streams across network connections 52*a-m*.

As shown in FIG. 2, the aircraft VTC proxy agent gateway 28 includes a processor unit 102 and a memory 104 and is coupled to the WAN interface unit 26 and the LAN interface unit 27. The processor unit 102 is coupled to the memory 104, the WAN interface unit 26 and the LAN interface unit 27. The memory 104 contains one or more programs or modules which, when executed by the processor unit 102, facilitate operability of the VTC communication system 20. In some embodiments, the memory 104 comprises a video processing software module 108, and a packet processing module 116. The video processing software module 108 processes communications to and from the WAN interface unit 26 and the LAN interface unit 27. The packet processing module 116 includes a network coder 117, a time stamper 123, concatenator 124, an ingress packet dropper 125, a deconcatenator 126, a network decoder 129, and an egress packet dropper 131.

Figure 3:
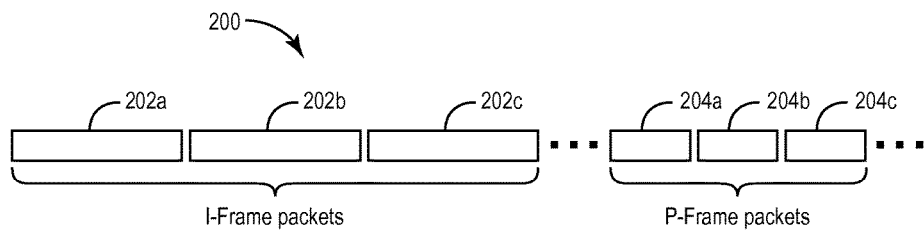
FIG. 3 is a schematic representation of video packets for the VTC communication system illustrated in FIG. 1.

With reference to FIG. 3, a video stream 200 for VTC services includes I-frame packets 202*a-c* and P-frame packets 204*a-c*. In some embodiments, the video stream is an H.264 video stream where an encoder encodes a still image (at an adaptive resolution) followed by encoded motion vectors that represent the deltas or the changes in the still image over short increments of time. The encoded motion vectors can be emitted for a period of time before the encoder emits a new still image (and then a new set of encoded vectors are emitted). The still image data is packed in Internet Protocol (IP) packets (e.g., the I-Frame packets 202*a-c*), while the motion vectors data is packed in the P-Frame packets 204*a-c*. A single packet loss can have a compound effect on the video quality of a video conference. For example, if the P-frame packet 204*a* is a missed packet from a group of the P-frame packets 204*a-c* after the I-frame packet 202*a*, the P-frame packets 204*b-c* coming after that missed packet 204*a* cause more harm than good because the motion vector estimation after the missing packet 204*a* results in the production of a garbled picture by a decoder. When the decoder receives a new I-frame packet (e.g., the I-frame packet 202*b*), the video stream clears again. Similarly, if one of the I-frame packets 202*a-c* is lost, the still frame is not be complete and the motion vector estimation resulted from all the P-Frame packets (until the next I-frame packet) can garble the decoded video.

With reference to FIGS. 2 and 3, the network coder 117 performs network coding on the downstream packets (video data from the aircraft 10 to the ground) and the network decoder 129 performs network decoding on upstream packets (e.g., video data from the ground to the aircraft 10). The upstream packets and downstream packets are buffered in the buffer 112. The coding by the network coder 117 and decoding by the network decoder 129 are error control coding techniques developed for packet streams. The error control coding is performed at the IP layer and targets cases where the service provider link packet loss probability can be unacceptable for VTC applications in some embodiments. Network coding reduces the effective packet loss ratio for the VTC applications that are sensitive to packet loss.

In some embodiments, if network conditions are such that BW is abundant or high (e.g., suitable for ordinary VTC conferencing) but packet loss is high (e.g., too high for suitable ordinary VTC conferencing), the aircraft VTC proxy agent gateway 28 and the ground VTC proxy agent gateway 42 trade some BW for reliability. For example, when a commercial jet has a broadband satellite link that has plenty of bandwidth but the link characteristics cause high packet loss, the VTC quality can still be unacceptable. In some embodiments, the aircraft VTC proxy agent gateway 28 at the ingress point to the air-ground link (e.g., the service provider network 32) protects both I-Frame and P-frame packets with using network coding by the network coder 117. In some embodiments, the network coder 117 encodes both I-frame packets 202a-c and P-frame packets 204a-c to create some redundancy packets that can overcome packet loss. Using network coding with I-frame packets 202a-c can be different from using network coding with P-frame packets 204a-c.

The I-frame packets tend to be large (except for the last packet in the frame) (e.g., as large as an Ethernet frame). The I-frame packets carry a lot of information; an entire image is encoded into a group of the I-frame packets 202a-c. The I-frame packets 202a-c arrive to the ingress point more or less as a burst. For high resolution H.264, there are more packets in the burst. For less resolution, there are less packets in the burst. To implement network coding for the I-frame packets 202a-c, the last packet is padded in the burst so that all I-frame packets 202a-c have the same size. If the number of I-frame packets 202a-c in the burst is K, network coding is applied to the K I-frame packets. K can be variable and network coding is adaptable. Based on the link characteristics, N is chosen where N–K is the number of redundant I-frame packets. When the BW is higher and the link quality is lower, the number N is larger. When the BW is lower and the link quality is higher, the number N is less.

The P-frame packets 204a-c are also encoded by the network coder 117. The P-frame packets tend to be short (e.g., carrying the motion vectors). The P-frame packets 204a-c arrive to the ingress point in a generally clocked manner (e.g., the inter-arrival time between the P-Frame packets 204a-c in the same P-frame window can depend on the resolution (high resolution means less inter-arrival time). The time period that a P-frame window covers also depends on the resolution (high resolution means I-frame packets are more frequent and hence P-frame window periods are smaller). Advantageously, the network coder 117 uses network coding for the P-frame packets 204a-c to pad packets as needed to create a fixed size for all L encoded packets. The L packets to be encoded is timing critical so a large number of P-frame packets are not used, and the network coding is applied to a limited number (L=4-6) of the P-Frame packets 204a-c in some embodiments. There is a closed loop between the ingress and egress points. Accordingly, encoding at the ground is decoded by the network decoder 129 at the aircraft and vice versa.

In some embodiments when network conditions are such that the BW is low or scarce (e.g., well below a level suitable for ordinary VTC conferencing), the aircraft VTC proxy agent gateway 28 at the ingress point to the air-ground link (e.g., the service provider network 32) intentionally drops at least one of the P-frame packets 204a-c using the ingress packet dropper 125 and protects the I-frame packets 202a-c using the network coder 117 with network coding. The number of dropped P-frame packets can be chosen based upon available bandwidth. The dropping of the P-frame packets 204a-c saves BW that is used for the I-frame packets 202a-c with network coding. For example, with the operation of the ingress packet dropper 125, the user sees an updated image every 1-2 seconds and no or rare garbled images. If the voice stream is synchronized, the user perception would be a mere inconvenience, but the session will continue. This technique prevents the user experience of a garbled screen most of the time.

In some embodiments, if BW is low (slightly tight or suitable VTC operations) but link quality is good (e.g., packet loss ratio is low), the aircraft VTC proxy agent gateway 28 at the ingress point to the air-ground link (e.g., the service provider network 32) can provide some saving of BW without shaping (intentionally dropping) or protection (e. g. by trading BW for reliability). The BW is saved by operation of the concatenator 124. For example, for a jet leasing a small size link (e.g., ~2-4 Mbps) for voice, video and data with the link quality guaranteed by the link provider, the concatenator 124 can concatenate the P-frame packets 204a-c into a large size packet at the ingress point to reduce header size and reduce the number of packets per second to save BW. The number of concatenated P-frame packets 204a-c can be limited (4-6 packets) to avoid timing synchronization problems as the P-frame packets 204a-c are synchronized. Upstream packets (e.g., video data from the ground to the aircraft 10) from multiple links or streams are buffered in the buffer 112 and the concatenated payloads are deconcatenated by the deconcatenator 126.

Figure 4:
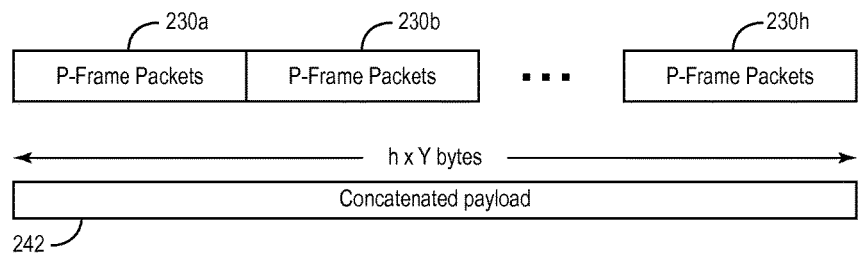
FIG. 4 is a schematic representation of a concatenated packet payload for the communication system illustrated in FIG. 2 according to exemplary aspects of the inventive concepts disclosed herein.
Figure 5:
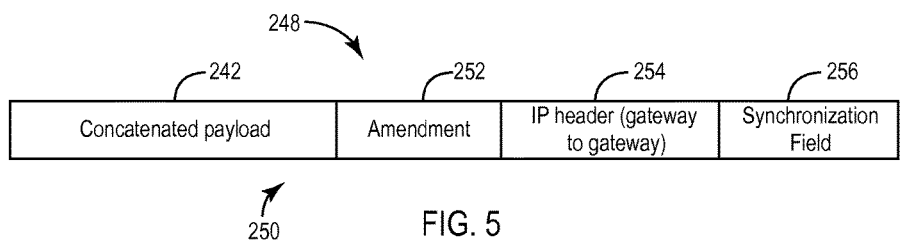
FIG. 5 is a schematic representation of a network packet for a video stream including a compound header and a concatenated packet payload for the communication system illustrated in FIG. 2 according to exemplary aspects of the inventive concepts disclosed herein.

With reference to FIGS. 4 and 5, P-frame packet payloads 230a-f are concatenated to form a single concatenated payload 242 by the concatenator 124. The concatenated payload 242 is provided with an IP header field 254 (FIG. 5) and an amendment 252 to form a network packet 248. The aircraft VTC proxy agent gateway 28 has a wide area network (WAN) interface to the ground VTC proxy agent gateway 42 that has a specific IP address. The ground VTC proxy agent gateway 42 has an interface to the aircraft 10 that has a specific IP address. These specific IP addresses are used to create the IP header field 254 for the concatenated payload 242.

The amendment 252 for the network packet 248 provides the minimum amount of information that allows the ground VTC proxy agent gateway 42 to recreate the headers for each of the P-frame packet payloads 230a-f. The amendment 252 includes f different segments, where each segment corresponds to the packet payloads 230a-f. The VTC communication system 20 can be configured to use a sequence of bits to separate each segment or to use a fixed-size byte length for each segment.

In some embodiments, the proxy agent of the aircraft VTC proxy agent gateway 28 concatenates the payloads 230a-f using a scheduler that can concatenate the f payloads 230a-f and relies on the proxy agent of the ground VTC proxy agent gateway 42 to reverse the concatenation (e.g., to deconcatenate). For the uplink traffic, the proxy agent of the ground VTC proxy agent gateway 42 concatenates the f payloads 230a-f provided by the ground network 44 (FIG. 1) and relies upon the aircraft VTC proxy agent gateway 28 to reverse the concatenation.

In some embodiments, the egress packet dropper 131 drops P-frame packets at the egress point to reduce adverse effects on user perception of the VTC quality. At the egress point (after the air-ground link (service provider network 32) and before reaching the H.264 decoder), the P-frame packets 204a-c are monitored. If a missing P-frame packet 204a-c is detected, all the P-frame packets 204a-c after the missing packet in the P-frame window are dropped by the egress packet dropper 131. Accordingly, all subsequent P-frame packets are dropped until the next I-frame packet 202a-c is received in some embodiments. The dropped P-packets can cause a garbled the screen if not dropped in some embodiments. The egress packet dropper 131 in essence freezes the video stream for a short period instead of having it garbled in some embodiments.

In some embodiments, the ingress packet dropper 125 can be operated to drop a P-frame packet every number P number of frames, where P is an integer (e.g., 1, 2, 3, etc.) This technique can be used if network conditions have a very tight BW but high reliability. With this technique, at the ingress point, the entire P-frame window of packets is dropped every other I-flame packet 202a-c or every three frames. This is a packet shaping method that reduces packet flow volume for the VTC session. The user perceives an alternation between frozen images and motion due to the shaping technique. This technique can be implemented in an adaptable manner in some embodiments by using a mechanism to sense the available bandwidth for the VTC session and adapt accordingly by dropping P-frame packets 204a-c every window (just allow still images), every three windows, or every other window in some embodiments.

The concatenation, packet dropping, and network coding techniques described above can be used all at once, individually, or as subsets according to various control schemes. The above proxy techniques can skew the associated with decoding voice and video for the user at the same time. Time stamps before the ingress techniques (in an option field 256 of the network packet 248 and other IP packets) can be used for synchronization. The time stamps are used at the egress point for emission of the packets in a synchronized manner for the H.264 decoder.

At least some of the elements associated with the packet processing in the aircraft VTC proxy agent gateway 28 can be realized in hardware. In some embodiments, payloads are processed at an IP layer of the aircraft VTC proxy agent gateway 28. The LAN interface unit 27 includes circuits for connecting the devices 24a-m to the processor unit 102 and circuits for facilitating VTC communications including transmitters, receivers, and operator controls, among other devices. The WAN interface unit 26 includes circuits for connecting the service provider network 32 to the processor unit 102 and circuits for facilitating VTC communications including transmitters, receivers, and operator controls, among other devices. The ground VTC proxy agent gateway 42 includes modules and circuitry for concatenation and deconcatenation and network coding and decoding similar to the modules and circuitry described above with respect to FIG. 2. In some embodiments, the aircraft VTC proxy agent gateway 28 and the ground VTC proxy agent gateway 32 are heuristic SDNs with capability to measure link characteristics such as bandwidth and reliability in real time. For example, a software module can measure the BW and packet drop ratio. The module can utilize the amount of leased BW and adaptively adjust to actual conditions. In some embodiments, a moving average of packet drop ration and BW is used to select the packet shaping, concatenation, and network coding techniques and parameters for such techniques.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for providing video teleconferencing services for a vehicle or remote location, the system comprising:
    a first gateway in communication with a service provider network; and
    a second gateway in communication with the first gateway via the service provider network, wherein the second gateway comprises a first proxy agent configured to communicate I-frame packets for a video teleconferencing service using network coding in a burst of an integer number K of packets, where the integer number K minus an integer number N is a number of redundant I-frame packets, and to communicate P-frame packets for the video teleconferencing service using network coding applied to an integer number L of the P-frame packets in a series, the number L being an integer less than 6.

2. The system of claim 1, the first gateway comprises a second proxy agent.

3. The system of claim 2, wherein the second gateway intentionally drops at least one of the P-frame packets before transmission on the service provider network to protect the communication of the I-frame packets in response to conditions on the service provider network.

4. The system of claim 2, wherein the second gateway concatenates the P-frame packets into concatenated packet in response to conditions on the service provider network.

5. The system of claim 4, wherein the concatenated packet includes a compound header.

6. The system of claim 1, wherein the first gateway is disposed in the vehicle and the second gateway is disposed at a ground location and coupled to a ground network with web services.

7. The system of claim 1, wherein the second gateway intentionally drops the P-frame packets before a next I-frame packet received from the service provider network in response to a missing P-frame packet.

8. The system of claim 1, wherein the second gateway intentionally drops at the P-frame packets before transmission on the service provider network every number of the I-frame packets in response to conditions on the service provider network.

9. The system of claim 8, wherein the number is from 1 to 3.

10. A method of providing video teleconferencing services for a vehicle or remote location, the method comprising:
    receiving I-packets and P-packets associated with the video teleconferencing services at a first proxy agent disposed on the vehicle or at the remote location;
    processing the I-packets and P-packets at the first proxy agent and intentionally dropping at least one P-frame packet in response to network conditions; and providing the I-packets and the undropped P-packets to a second proxy agent in communication with the first proxy agent via a service provider network having the network conditions.

11. The method of claim 10, further comprising:
receiving the I-packets and P-packets associated with the video teleconferencing services at the second proxy agent disposed at a ground location; and
processing the I-packets and P-packets at the second proxy agent and intentionally dropping at least one of the P-packets in response to the network conditions.

12. The method of claim 10, further comprising:
providing the I-packets and P-packets associated with the video teleconferencing services processed by at the second proxy agent to a Cisco web services network.

13. The method of claim 10, further comprising:
concatenating the P-packets associated with the video teleconferencing services at the first proxy agent; and
deconcatenating the P-packets associated with the video teleconferencing services at the second proxy agent.

14. The method of claim 13, wherein the P-frame packets are concatenated and provided as concatenated packet with a compound header.

15. The method of claim 10, wherein voice packets are separated from the I-frame packets and P-frame packets and sent as VOIP packets using proxies.

16. The method of claim 14, wherein I-frame packets and P-frame packets are processed so that the I-frame packets are sent with redundant I-frame packets and the P-frame packets are sent without redundant P-frame packets.

17. A system for providing video teleconferencing services for a vehicle or remote location, the system comprising:
a first gateway disposed on the vehicle or at the remote location in communication with a service provider network, the service provider network being in communication with a second gateway in communication with a ground network with a web services, wherein the first gateway processes I-frame packets and P-frame packets for a video teleconferencing service, wherein the P-frame packets are intentionally dropped either before transmitting from the first gateway to the service provider network in response to network conditions or after receipt by the first gateway from the service provider network in response to a missing P-frame packet.

18. The system of claim 17, wherein the I-frame packets are provided as a burst of K packets according to network coding, where K–N is a number of redundant I-frame packets, where K is an integer and N is an integer number, wherein the network coding is applied to a number L of the P-frame packets in a series, the number L being an integer less than 6.

19. The system of claim 17, wherein the I-frame packets and the P-frame packets are provided by an H.264 decoder.

20. The system of claim 17, wherein the first gateway concatenates the P-frame packets and does not concatenate the I-frame packets.

* * * * *